(12) United States Patent
Tanaka et al.

(10) Patent No.: US 9,387,553 B2
(45) Date of Patent: *Jul. 12, 2016

(54) LASER IRRADIATION METHOD AND LASER IRRADIATION APPARATUS

(75) Inventors: Koichiro Tanaka, Isehara (JP); Hirotada Oishi, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 287 days.

This patent is subject to a terminal disclaimer.

(21) Appl. No.: 13/216,669

(22) Filed: Aug. 24, 2011

(65) Prior Publication Data

US 2011/0304920 A1 Dec. 15, 2011

Related U.S. Application Data

(60) Division of application No. 12/536,053, filed on Aug. 5, 2009, now Pat. No. 8,045,271, and a continuation of application No. 11/120,990, filed on May 4, 2005, now Pat. No. 7,595,932.

(30) Foreign Application Priority Data

May 14, 2004 (JP) .................................. 2004-145612

(51) Int. Cl.
*G02B 27/10* (2006.01)
*B23K 26/073* (2006.01)
(Continued)

(52) U.S. Cl.
CPC ......... *B23K 26/0738* (2013.01); *B23K 15/0093* (2013.01); *B23K 15/10* (2013.01);
(Continued)

(58) Field of Classification Search
USPC .................................................. 359/618–623
See application file for complete search history.

(56) References Cited

U.S. PATENT DOCUMENTS 4,769,750 A 9/1988 Matsumoto et al.
4,951,274 A 8/1990 Iwanaga et al.
(Continued)

FOREIGN PATENT DOCUMENTS

CN 1492255 4/2004
EP 1 400 832 3/2004
(Continued)

OTHER PUBLICATIONS

European Search Report (Application No. 05008796.4) dated Aug. 2, 2005.
(Continued)

*Primary Examiner* — Alicia M Harrington
(74) *Attorney, Agent, or Firm* — Eric J. Robinson; Robinson Intellectual Property Law Office, P.C.

(57) ABSTRACT

The present invention is to provide a laser irradiation technique for irradiating the irradiation surface with the laser beam having homogeneous intensity distribution using a cylindrical lens array without being affected by the intensity distribution of the original beam. A laser beam emitted from a laser oscillator is divided by two kinds of cylindrical lens arrays into a plurality of beams, which are two kinds of linear laser beams with their energy intensity distribution inverted each other, and the two kinds of linear laser beams are superposed in a minor-axis direction. This can form the linear laser beam having homogeneous intensity distribution on the irradiation surface.

15 Claims, 8 Drawing Sheets

(51) Int. Cl.
  *B23K 15/00* (2006.01)
  *B23K 15/10* (2006.01)
  *G02B 27/09* (2006.01)

(52) U.S. Cl.
  CPC ........ *B23K26/0732* (2013.01); *G02B 27/0927* (2013.01); *G02B 27/0961* (2013.01); *G02B 27/0966* (2013.01)

(56) References Cited

U.S. PATENT DOCUMENTS

| | | | |
|---|---|---|---|
| 5,153,773 | A | 10/1992 | Muraki et al. |
| 5,463,497 | A | 10/1995 | Muraki et al. |
| 5,900,980 | A | 5/1999 | Yamazaki et al. |
| 5,959,779 | A | 9/1999 | Yamazaki et al. |
| 6,002,523 | A | 12/1999 | Tanaka |
| 6,038,075 | A | 3/2000 | Yamazaki et al. |
| 6,061,375 | A | 5/2000 | Zhang et al. |
| 6,104,535 | A | 8/2000 | Tanaka |
| 6,137,633 | A | 10/2000 | Tanaka |
| 6,160,827 | A | 12/2000 | Tanaka |
| 6,176,926 | B1 | 1/2001 | Tanaka |
| 6,212,012 | B1 | 4/2001 | Tanaka |
| 6,239,913 | B1 | 5/2001 | Tanaka |
| 6,246,524 | B1 | 6/2001 | Tanaka |
| 6,300,176 | B1 | 10/2001 | Zhang et al. |
| 6,355,940 | B1 | 3/2002 | Koga et al. |
| 6,373,633 | B1 | 4/2002 | Brown |
| 6,392,810 | B1 | 5/2002 | Tanaka |
| 6,393,042 | B1 | 5/2002 | Tanaka |
| 6,440,785 | B1 | 8/2002 | Yamazaki et al. |
| 6,538,819 | B2 | 3/2003 | Tanaka |
| 6,548,370 | B1 | 4/2003 | Kasahara et al. |
| 6,567,219 | B1 | 5/2003 | Tanaka |
| 6,573,162 | B2 | 6/2003 | Tanaka et al. |
| 6,646,807 | B2 | 11/2003 | Yoshikawa et al. |
| 6,690,515 | B2 | 2/2004 | McCulloch et al. |
| 6,707,614 | B2 | 3/2004 | Tanaka |
| 6,728,039 | B2 | 4/2004 | Tanaka |
| 6,738,129 | B2 | 5/2004 | Mizouchi |
| 6,818,568 | B2 | 11/2004 | Tanaka |
| 6,856,630 | B2 | 2/2005 | Tanaka |
| 7,026,227 | B2 | 4/2006 | Tanaka |
| 7,078,281 | B2 | 7/2006 | Tanaka et al. |
| 7,092,415 | B2 | 8/2006 | Tanaka |
| 7,112,517 | B2 | 9/2006 | Tanaka et al. |
| 7,135,390 | B2 | 11/2006 | Tanaka |
| 7,245,802 | B2 | 7/2007 | Tanaka |
| 7,259,082 | B2 | 8/2007 | Tanaka |
| 7,372,630 | B2 | 5/2008 | Tanaka |
| 7,418,172 | B2 | 8/2008 | Tanaka et al. |
| 7,450,307 | B2 | 11/2008 | Tanaka et al. |
| 7,479,420 | B2 | 1/2009 | Tanaka |
| 7,594,965 | B2 | 9/2009 | Tanaka |
| 7,595,932 | B2 | 9/2009 | Tanaka et al. |
| 7,674,663 | B2 | 3/2010 | Yamazaki et al. |
| 2003/0058916 | A1 | 3/2003 | Tanaka et al. |
| 2004/0223225 | A1 | 11/2004 | Mikhailov |
| 2005/0232316 | A1 | 10/2005 | Akasaka et al. |

FOREIGN PATENT DOCUMENTS

| | | |
|---|---|---|
| JP | 61-156218 | 7/1986 |
| JP | 10-253916 | 9/1998 |
| JP | 11-016851 A | 1/1999 |
| JP | 2000-111714 | 4/2000 |
| JP | 2000-323428 A | 11/2000 |
| JP | 2002-353090 | 12/2002 |
| JP | 2003-066368 A | 3/2003 |
| JP | 2003-255262 A | 9/2003 |
| WO | 03/016963 | 2/2003 |

OTHER PUBLICATIONS

Office Action (Application No. 200510072607.1) dated Feb. 15, 2008.

Search Report (Application No. 09010674.1) dated Sep. 28, 2009.

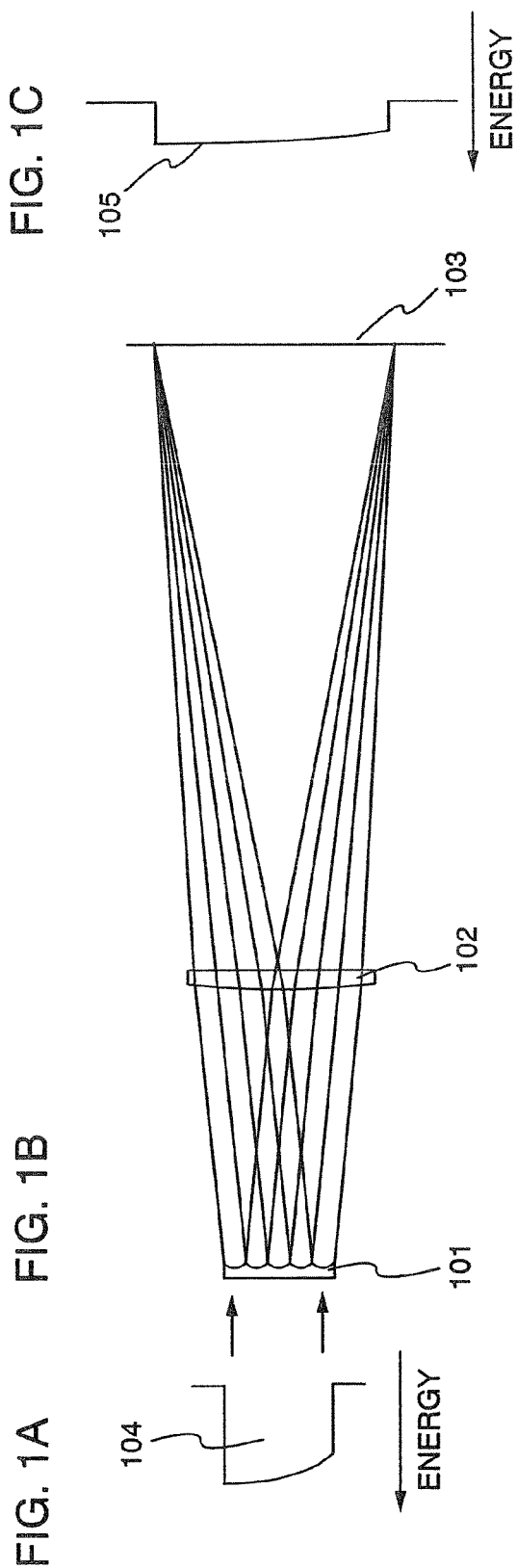

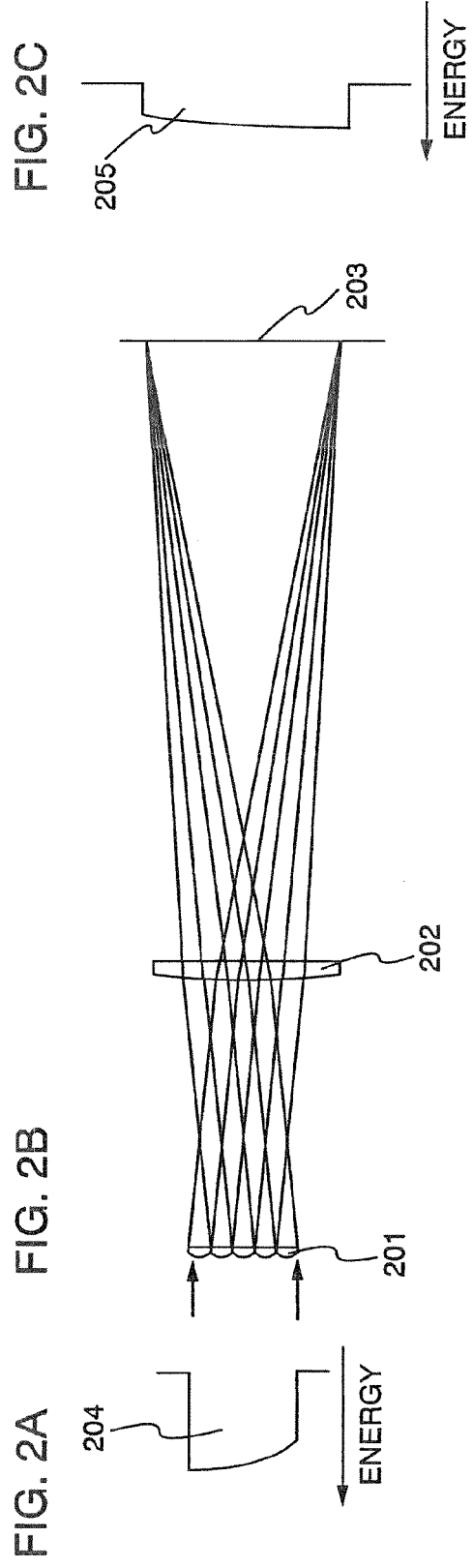

PERSPECTIVE VIEW

PERSPECTIVE VIEW

FRONT VIEW

FRONT VIEW

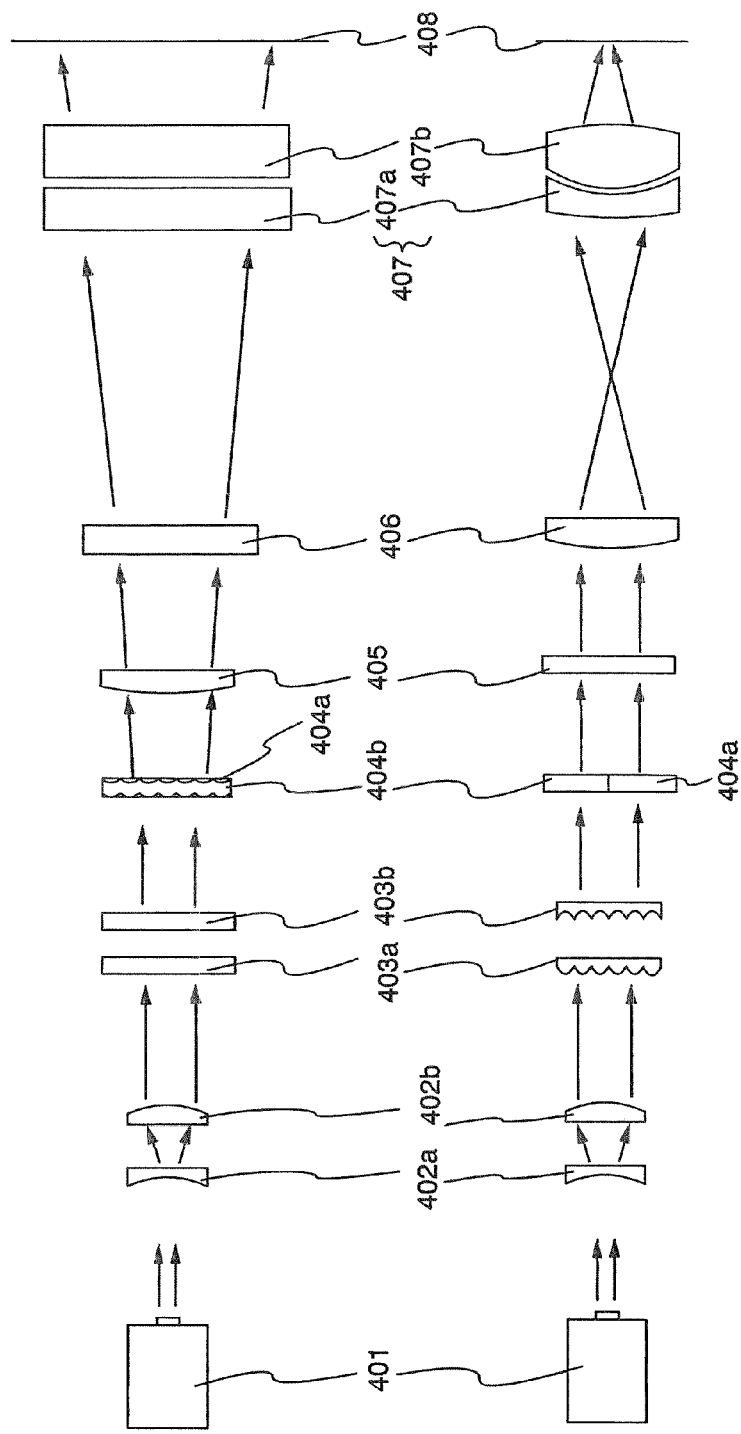

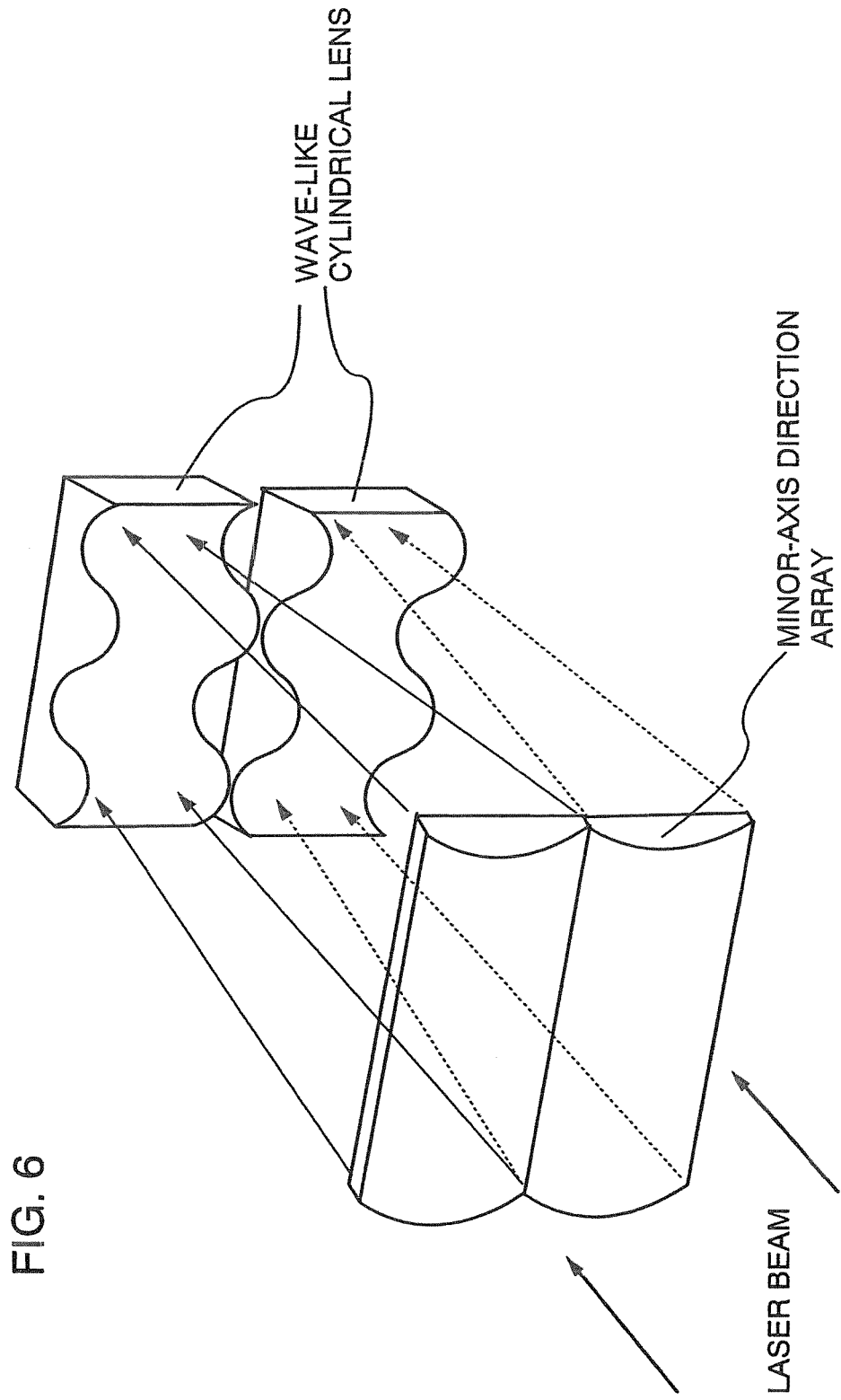

LASER IRRADIATION METHOD AND LASER IRRADIATION APPARATUS

BACKGROUND OF THE INVENTION

1. Field of the Invention

The present invention relates to a laser irradiation method and a laser irradiation apparatus which are suitable, for example, for crystallizing an amorphous semiconductor film and which can project a linear laser beam having homogeneous intensity distribution to an irradiation surface. More specifically, the present invention relates to a laser irradiation method and apparatus using a cylindrical lens which can form a laser beam having homogeneous intensity distribution and which can project the linear laser beam having homogeneous intensity distribution onto an irradiation surface without causing the linear laser beam to have bias in its intensity distribution in reflection of intensity distribution of an original beam.

2. Description of the Related Art

Conventionally, a semiconductor device has been manufactured by crystallizing an amorphous silicon film generally through heat treatment or laser annealing. Since the heat treatment is performed at high temperature, a glass substrate has a problem of being softened due to the heat, for example. The laser annealing is superior to the heat treatment in that such a problem can be avoided. For example, a poly-crystalline silicon film can be obtained when laser irradiation is performed in such a way that after a pulsed excimer laser beam is shaped into a linear laser beam spot by an optical system, the linear laser beam spot is scanned on the amorphous silicon film.

Despite the advantage mentioned above, the laser annealing has a problem of irradiation unevenness on a film because the intensity distribution of the linear laser beam fluctuates when the laser beam is scanned. This irradiation unevenness varies a semiconductor characteristic within the substrate. Therefore, when a display device with a driver and a pixel integrated (system-on-panel) is manufactured with the film having irradiation unevenness, the irradiation unevenness appears directly on the screen of the display device. The irradiation unevenness causes a problem particularly when a display device with high accuracy and high characteristic, typically an EL display, is manufactured.

In the case of forming a linear laser beam by the laser irradiation apparatus, a laser beam emitted from a laser oscillator (hereinafter referred to as an original beam) is generally divided by a cylindrical lens array. Then, the divided laser beams are superposed by a cylindrical lens, and thus a linear laser beam is formed on the irradiation surface. When this linear laser beam is used to process the semiconductor film, it is required that the linear laser beam has high homogeneity in which the energy density fluctuates within several %.

However, when the requirement is not satisfied, for example when the linear laser beam does not have homogeneous energy distribution in the major-axis direction (or longitudinal direction), it is difficult to perform laser processing all over the region in the major-axis direction within the optimum energy range. As a result, it becomes impossible to process the entire surface of the substrate homogeneously, and thus the irradiation unevenness occurs. That is to say, in the case where the energy distribution of the linear laser beam fluctuates in the major-axis direction depending on the intensity distribution of the original beam, the irradiation unevenness occurs in reflection of the change of the intensity distribution of the original beam per unit time.

Generally, in order to increase the homogeneity of the linear laser beam, the number of cylindrical lenses constituting the cylindrical lens array is increased so that the original beam is divided into more beams. However, with the increase of the number of divided beams, the interference between the divided beams become more remarkable, which may result in the appearance of the interference fringes on the irradiation surface. Moreover, when a cylindrical lens array is manufactured with cylindrical lenses each having large aspect ratio between its width and length, enough strength and lens accuracy are difficult to achieve; therefore, the desired beam is difficult to obtain. For this reason, actually, it is difficult to increase the number of divided beams more than the predetermined number in the laser irradiation.

When the intensity distribution of the original beam has bias in one direction, each of the divided beams also has the bias in its intensity distribution. Therefore, the linear laser beam formed by combining the divided beams on the irradiation surface also reflects the bias in the distribution of the original beam. Although the number of divided beams is increased, the linear laser beam has the intensity distribution with the bias in the major-axis direction in the same manner; therefore homogeneous processing is impossible. As thus described, in the case of homogenizing the laser beam with the conventional cylindrical lens array, it has been impossible to form the homogenous laser beam on the irradiation surface when the original beam does not have symmetrical intensity distribution.

Furthermore, in the case of a gas laser, it is necessary to cool a tube with medium gas enclosed in which a laser beam is excited. Since the oscillation characteristic of the laser is affected by, for example, the fluctuation of the cooling water flow rate, the intensity distribution of the original beam may fluctuate. Moreover, it has been known that the intensity distribution of the original beam may fluctuate due to thermal distortion of an element in the resonator. In addition, the intensity distribution of the original beam may fluctuate due to various other factors. An optical system including the conventional cylindrical lens is sensitive to the fluctuation of the original beam.

In order to process the object homogeneously and stably, an optical system is required which can form a homogeneous linear laser beam constantly without depending on the intensity distribution of the original beam. Moreover, an optical system is required which is less sensitive to the fluctuation of the intensity distribution of the original beam. For these reasons, a laser irradiation method and a laser irradiation apparatus have been required which can project the linear laser beam having homogeneous intensity distribution without being affected by the intensity distribution of the original beam. A laser annealing apparatus including a cylindrical lens has been already applied for a patent by the present inventor (see Reference 1: Japanese Patent Application Laid-Open No. 10-253916). This laser annealing apparatus includes a cylindrical lens array having convex cylindrical lenses and concave cylindrical lenses arranged alternately.

SUMMARY OF THE INVENTION

It is an object of the present invention to provide a laser irradiation method and a laser irradiation apparatus which are suitable, for example, for crystallizing an amorphous semiconductor film and which can deliver a laser beam having homogeneous intensity distribution without causing bias in the energy intensity in reflection of bias in the intensity distribution of the original beam. It is to be noted that the present invention uses a cylindrical lens so as to facilitate the optical alignment with a configuration different from that disclosed in the Reference 1.

As described above, the present invention is to provide a laser irradiation method and a laser irradiation apparatus which are suitable, for example, for crystallizing an amorphous semiconductor film and which can project a linear laser beam having homogeneous intensity distribution to an irradiation surface. A laser irradiation method according to the present invention comprises the steps of forming two kinds of linear laser beams with their energy intensity distribution inverted by dividing a laser beam emitted from a laser oscillator into a plurality of beams through two kinds of cylindrical lens arrays, and projecting the two kinds of linear laser beams so that they are superposed in a minor-axis direction. A laser irradiation apparatus according to the present invention comprises a laser oscillator, two kinds of cylindrical lens arrays for dividing a laser beam emitted from the laser oscillator into a plurality of beams with their energy intensity distribution inverted, a condensing lens for superposing the beams divided by the two kinds of arrays in the minor-axis direction so as to form a linear laser beam, and a stage for having an irradiation surface mounted where the laser transmitted through the condensing lens is projected.

In the laser irradiation method and the laser irradiation apparatus of the present invention, two kinds of cylindrical lens arrays preferably have either one of the following configurations: a concave cylindrical lens array is connected to a convex cylindrical lens array in a direction of their generating lines; and a first combined cylindrical lens array in which convex cylindrical lenses and concave cylindrical lenses are arranged alternately in a direction of curvature is connected to a second combined cylindrical lens array in which convex cylindrical lenses and concave cylindrical lenses are arranged alternately in a direction of curvature in the opposite way of the first combined cylindrical lens array. Specifically, in the latter configuration, the concave cylindrical lens in the first combined cylindrical lens array is preferably connected to the convex cylindrical lens in the second combined cylindrical lens array in the direction of their generating lines.

According to the present invention, two kinds of cylindrical lens arrays are combined so that a laser beam emitted from a laser oscillator is divided into a plurality of beams with their energy distribution inverted. For example, as shown in FIG. 3A, a convex cylindrical lens array is connected and combined with a concave cylindrical lens array in a direction of their generating lines. Therefore, the laser beam transmitted through the convex cylindrical lens array and the laser beam transmitted through the concave cylindrical lens array are condensed by a condensing lens in such a way that they have the inverted energy intensity distribution.

As a result, although the original beam has bias in the energy intensity distribution, the bias can be offset on the irradiation surface because the laser beams transmitted through the convex and concave cylindrical lens arrays are projected to the irradiation surface with their distribution inverted to each other. Therefore, according to the present invention, the intensity distribution having bias in one direction can be offset, thereby forming a linear laser beam with high homogeneity on the irradiation surface. Moreover, an optical system that is difficult to be affected by the fluctuation of the intensity distribution of the original beam can be constituted.

BRIEF DESCRIPTION OF THE DRAWINGS

In the accompanying drawings:

FIGS. 1A to 1C are drawings showing energy intensity distribution of a laser beam in the case where a linear laser beam is formed by a concave cylindrical lens array in a major-axis direction;

FIGS. 2A to 2C are drawings showing energy intensity distribution of a laser beam in the case where a linear laser beam is formed by a convex cylindrical lens array in a major-axis direction;

FIGS. 4A and 4B are drawings showing a first embodiment mode of a laser irradiation apparatus of the present invention which uses the combination of the cylindrical lens arrays in FIG. 3A;

FIG. 6 is a drawing showing a second embodiment mode of a laser irradiation apparatus of the present invention using the combination of the lens shown in FIG. 3B;

DETAILED DESCRIPTION OF THE INVENTION

Embodiment Mode

Figure 3A:
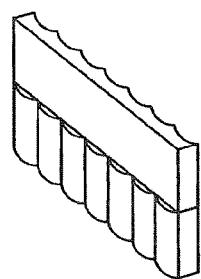
FIGS. 3A to 3D are drawings showing modes of combinations of a convex cylindrical lens array with a concave cylindrical lens array which are used for homogenizing energy intensity distribution on an irradiation surface.

An embodiment mode and an embodiment are hereinafter described with reference to the drawings. However, the present invention is not limited to the description of the following embodiment mode and embodiment, and is specified by the description of the scope of the claims. In the present invention, a laser beam emitted from a laser oscillator is divided by two kinds of cylindrical lens arrays into a plurality of beams with their energy intensity distribution inverted. Therefore, the bias in the energy intensity distribution is offset, and a linear laser beam with high homogeneity can be formed on the irradiation surface. A configuration, a function, a characteristic, usage, and the like of these cylindrical lenses are hereinafter described.

In order to homogenize the laser beam with the cylindrical lens, a concave or convex cylindrical lens is usually used. FIGS. 1A to 1C illustrate a step of shaping a linear laser beam in a major-axis direction by a concave cylindrical lens array 101 using concave cylindrical lenses. FIG. 1A illustrates the energy intensity distribution of the original laser beam before transmitting through the cylindrical lens array, FIG. 1B schematically illustrates the laser beam after transmitting through the cylindrical lens array, and FIG. 1C illustrates the energy intensity distribution of the laser beam on the irradiation surface. The linear laser beam is formed on the irradiation surface 103 in such a way that after the laser beam is divided by the concave cylindrical lens array 101 into a plurality of beams, they are combined by a condensing lens 102 on the irradiation surface 103. When a linear laser beam is formed by dividing the original beam having energy distribution 104 with bias in one direction by the array 101, energy distribution 105 with bias in one direction is formed on the irradiation surface 103.

On the other hand, FIGS. 2A to 2C illustrate a step of shaping a linear laser beam in a major-axis direction by a convex cylindrical lens array 201 using convex cylindrical lenses. FIG. 2A illustrates the energy intensity distribution of the original laser beam before being incident into the cylindrical lens array, FIG. 2B schematically illustrates the laser beam after transmitting through the cylindrical lens array 201, and FIG. 2C illustrates the energy intensity distribution of the laser beam on an irradiation surface 203. When the original beam has biased energy distribution 204, the beams divided by the convex cylindrical lens array 201 also has the energy distribution with the bias in the same manner as the distribution formed by the concave cylindrical lens array 101. However, since the laser beam transmitted through the convex cylindrical lens expands after being condensed once, energy distribution 205 formed on the irradiation surface 203 is inverted from the energy distribution 105 formed by the concave cylindrical lens array 101.

As thus described, when a linear laser beam is formed with either the convex cylindrical lens array or the concave cylindrical lens array, the intensity distribution of the linear laser beam formed on the irradiation surface reflects the energy intensity distribution of the original beam in common. However, the energy intensity distribution formed by these two arrays on the irradiation surface are inverted. The present inventors have paid attention to this point, and have made the present invention based on this fact.

According to the present invention based on this fact, an original beam is divided into a plurality of regions, and a convex cylindrical lens array or a concave cylindrical lens array is made to act on each region so as to offset the bias in the intensity distribution of the original beam. For example, a connected cylindrical lens array shown in FIG. 3A is manufactured by stacking a convex cylindrical lens array and a concave cylindrical lens array. FIG. 3C is a front view of FIG. 3A.

As mentioned above, the energy intensity distribution formed on the irradiation surface by the convex and concave cylindrical lens arrays in reflection of the energy intensity distribution of the original beam are inverted. This is a characteristic of a combination of these two kinds of cylindrical lens arrays. Therefore, it becomes possible to offset the bias in the intensity distribution of the original beam by dividing the original beam into a plurality of regions and having the convex or concave cylindrical lens array act on each region. For example, the connected cylindrical lens array shown in FIG. 3A can be manufactured by stacking a convex cylindrical lens array using plural convex cylindrical lenses and a concave cylindrical lens array using plural concave cylindrical lenses in a direction of their generating lines.

When the cylindrical lens array shown in FIG. 3A is used to form a linear laser beam, the concave cylindrical lens array acts on an upper half region of the laser beam in the minor-axis direction and the convex cylindrical lens array acts on a lower half region of the laser beam in the minor-axis direction. For this reason, since both of the distribution formed by the convex cylindrical lens array and the distribution formed by the concave cylindrical lens array contribute to the energy distribution formed on the irradiation surface in the major-axis direction, the bias in the intensity distribution of the original beam can be offset.

According to the present invention, the laser beam emitted from the laser oscillator is divided into a plurality of beams, preferably into the even number of beams, and the divided beams transmit through two kinds of cylindrical lens arrays where the convex cylindrical lens array and the concave cylindrical lens array are combined, which is referred to as a connected cylindrical lens array. When the beam is divided, it is preferable to adjust in advance, by the cylindrical lens, the width of the laser beam in the minor-axis direction which is incident into the convex or concave cylindrical lens array constituting the connected cylindrical lens array so that the width thereof does not exceed the width of the concave or convex cylindrical lens array. Thus, the laser beam does not transmit through the joint of the concave and convex cylindrical lens arrays in the connected cylindrical lens array, thereby forming a more homogeneous linear laser beam.

Figure 3B:
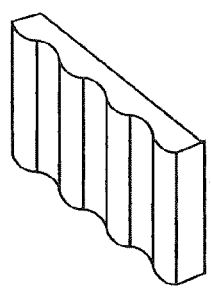
Figure 3C:
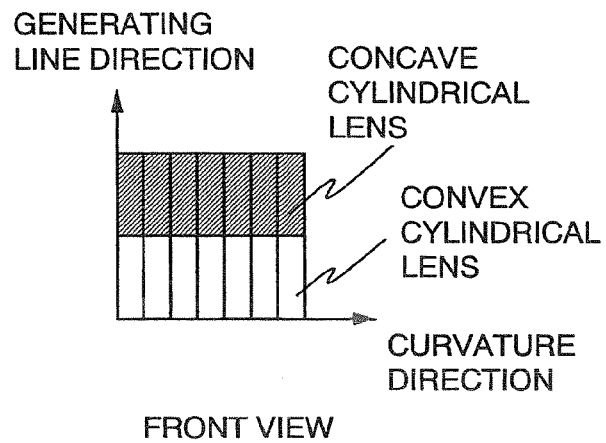
Figure 3D:
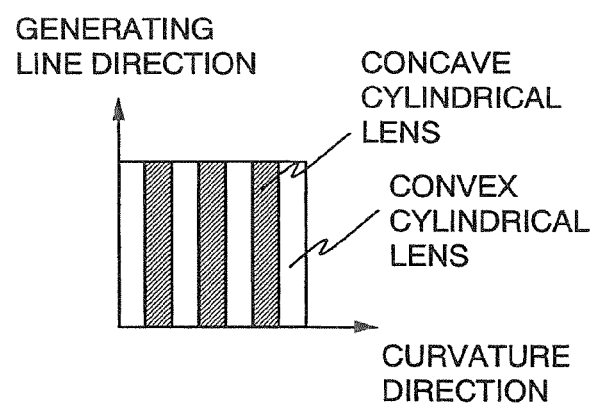

Moreover, besides the two kinds of cylindrical lens arrays shown in FIG. 3A, two kinds of cylindrical lens arrays may be formed by using a cylindrical lens array where concave cylindrical lenses and convex cylindrical lenses are arranged alternately in the direction of the curvature as shown in FIG. 3B, which is referred to as a wave-like cylindrical lens array. FIG. 3D is a front view of FIG. 3B. In this case, two kinds of wave-like cylindrical lens arrays with their convex portions in opposite positions are used in combination as shown in FIG. 6. Although the energy intensity distribution of the original beam has the bias in the same way as that illustrated in FIG. 3A, the combined wave-like cylindrical lens arrays make it possible to project the laser beams transmitted through the cylindrical lens arrays to the irradiation surface with their distribution inverted, to offset the bias in the energy intensity distribution of the original beam, and to form a linear laser beam having high homogeneity on the irradiation surface. It is to be noted that an embodiment mode using these wave-like cylindrical lens arrays is described later in detail.

An embodiment mode (hereinafter referred to as a first embodiment mode) of a laser irradiation apparatus according to the present invention is described more specifically with reference to FIGS. 4A and 4B. That is to say, the conditions of the lens, for example the radius of curvature, the thickness, the width of each lens, and the distance between the lenses are described specifically. FIG. 4A is a plan view, and FIG. 4B is a side view. FIG. 4B is described first. A laser beam emitted from a laser oscillator 401 is propagated in a direction indicated by an arrow in FIGS. 4A and 4B, and is expanded by spherical lenses 402a and 402b. This configuration is not necessary when the laser oscillator 401 emits a laser beam of sufficiently large size.

The laser beam emitted from the laser oscillator 401 is divided in a minor-axis direction by cylindrical lens arrays acting on the minor-axis direction. The cylindrical lens arrays acting on the minor-axis direction comprise a convex cylindrical lens array 403a and a concave cylindrical lens array 403b, which determine the length and homogeneity of the linear laser beam in the minor-axis direction. In the present invention, the laser beam emitted from the laser oscillator is divided into a plurality of beams as described above, and the divided beams are transmitted through a connected cylindrical lens array in which two kinds of cylindrical lens arrays (a convex cylindrical lens array and a concave cylindrical lens array) are combined. The number of divided beams is desirably even. It is preferable that the laser beam is divided so that the laser beam is not incident into the joint of the concave and convex cylindrical lens arrays which form the connected cylindrical lens array.

For this reason, in the apparatus shown in FIGS. 4A and 4B, the cylindrical lens arrays 403a and 403b are provided before the connected cylindrical lens array, in other words, on the side of the connected cylindrical lens array where the laser beam is incident. The width of the laser beam incident into the connected cylindrical lens array in the minor-axis direction is adjusted so that the width thereof does not exceed the width of the convex or concave cylindrical lens array constituting the connected cylindrical lens array. Thus, the laser beam is not incident into the joint of the convex and concave cylindrical lens arrays in the connected cylindrical lens array. Although the laser beam emitted from the laser oscillator can be divided by the connected cylindrical lens array whose purpose is to offset the bias of the intensity distribution of the original beam, it is preferable to divide the laser beam with the cylindrical lens arrays 403a and 403b in advance as described above.

In FIGS. 4A and 4B, the cylindrical lens array 403a has six convex cylindrical lenses each having a thickness of 3 mm, a width of 3 mm, and the first surface with a radius of curvature of +146 mm. The cylindrical lens array 403b has six concave cylindrical lenses each having a thickness of 3 mm, a width of 3 mm, and the first surface with a radius of curvature of −219 mm. The distance between the cylindrical lens arrays 403a and 403b is 510 mm. The sign of the radius of curvature is positive when the center of the curvature is on the side where the beam is emitted with respect to the lens surface. The sign is negative when the center of the curvature is on the side where the beam is incident with respect to the lens surface. The surface of the lens into which the laser beam is incident is referred to as the first surface, and the surface from which the laser beam is emitted is referred to as the second surface.

A cylindrical lens 406 for condensing the laser beam in the minor-axis direction is set at 195 mm from the concave cylindrical lens array 403b toward the irradiation surface. The cylindrical lens 406 has a thickness of 5 mm and the first surface with a radius of curvature of +194 mm. With this cylindrical lens 406, the laser beams transmitted through the two kinds of arrays are condensed into one region, and a homogeneous plane is formed between the cylindrical lens 406 and the irradiation surface. Moreover, with the cylindrical lens 406, the energy distribution of the beam spot is homogenized in the minor-axis direction, and the linear laser beam having homogeneous energy distribution can be formed by transferring the formed homogeneous plane to the irradiation surface.

In order to transfer the homogeneous plane, a doublet cylindrical lens 407 is set at 1465 mm from the cylindrical lens 406 toward the irradiation surface. It is preferable to set the doublet cylindrical lens 407 because the linear laser beam can be made longer; however, the doublet cylindrical lens 407 is not necessarily provided. The doublet cylindrical lens is a lens consisting of two cylindrical lenses.

One of two cylindrical lenses constituting the doublet cylindrical lens has a thickness of 10 mm, the first surface having a radius of curvature of +125 mm, and the second surface having a radius of curvature of +77 mm. The other has a thickness of 20 mm, the first surface having a radius of curvature of +97 mm, and the second surface having a radius of curvature of −200 mm. The distance between the two cylindrical lenses is 5.5 mm. This can homogenize the energy distribution of the beam spot in the minor-axis direction and determines the length thereof in the minor-axis direction. The laser beam is condensed on an irradiation surface 408 set at 208 mm from the doublet cylindrical lens toward the irradiation surface. Thus, a beam having homogeneous energy distribution in the minor-axis direction can be formed.

Next, the plan view of FIG. 4A is described. The laser beam emitted from the laser oscillator 401 is divided in the major-axis direction by a connected cylindrical lens array using a convex cylindrical lens array 404a and a concave cylindrical lens array 404b. The connected cylindrical lens array determines the length and homogeneity of the linear laser beam. The convex cylindrical lens array 404a has seven convex cylindrical lenses arranged in a direction of curvature. Each cylindrical lens has a thickness of 5 mm, a width of 6.5 mm, and the first surface with a radius of curvature of +35 mm. These convex cylindrical lenses are arranged so that the upper end of the array is equal to the height of the optical axis of the laser beam. Accordingly, the convex cylindrical lens array 404a acts on only the beam transmitted through the lower part of the cylindrical lens 403b.

The concave cylindrical lens array 404b has seven concave cylindrical lenses arranged in the direction of curvature. Each cylindrical lens has a thickness of 4.8 mm, a width of 6.5 mm, and the second surface with a radius of curvature of +35 mm. The concave cylindrical lens array 404b is set so that the lower end of the array is equal to the height of the optical axis of the laser beam. Accordingly, the concave cylindrical lens array 404b acts on only the beam transmitted through the upper part of the cylindrical lens array 403b.

The convex cylindrical lens array 404a and the concave cylindrical lens array 404b correspond to a connected cylindrical lens array of the present invention. A cylindrical lens 405 acting on the major-axis direction is set at 70 mm from the connected cylindrical lens array toward the irradiation surface to combine the laser beams on an irradiation surface 408. The cylindrical lens 405 has a thickness of 5 mm and the first surface having a radius of curvature of +870 mm. The cylindrical lens 405 homogenizes the energy distribution of the beam spot in the major-axis direction and determines the length thereof in the major-axis direction.

The laser beams formed by transmitting through the convex cylindrical lens array 404a and the concave cylindrical lens array 404b have the energy distribution inverted to each other in the major-axis direction. The laser beams transmitted through the cylindrical lens arrays, which have the intensity distribution inverted to each other, are condensed by the cylindrical lens 406. Therefore, it becomes possible to offset the bias in the intensity distribution of the beam emitted from the laser oscillator. For this reason, the cylindrical lens 406 and the connected cylindrical lens array are both essential in the present invention. With this configuration, a linear laser beam having homogeneous energy distribution in the major-axis direction can be formed without being affected by the intensity distribution of the original beam. Further, an optical system which is less sensitive to the fluctuation of the intensity distribution can be constituted.

Figure 5A:
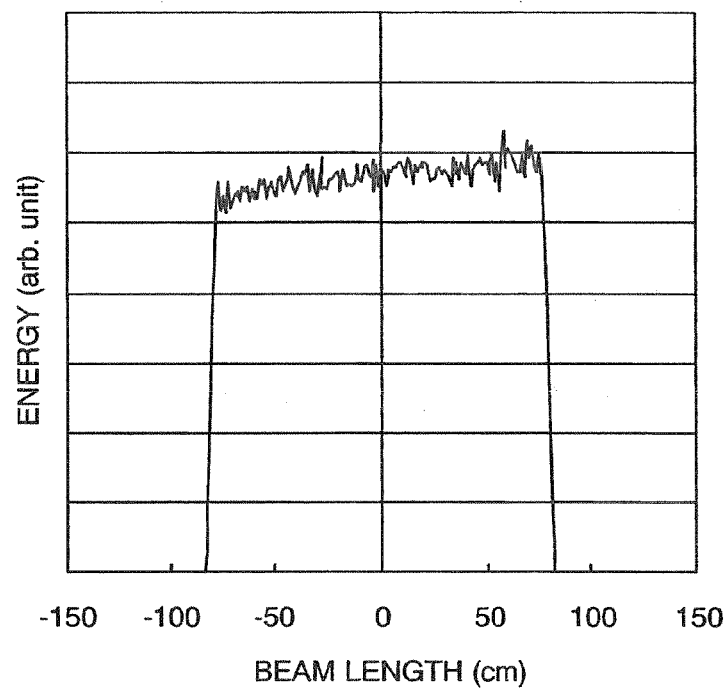
FIGS. 5A and 5B are graphs of energy intensity distribution simulated by optical design software in relation with the case of the comparative mode using only a convex cylindrical lens in the same way as the case of a laser irradiation apparatus shown in the first embodiment mode of the present invention in FIG. 4 and the case shown in FIG. 2.
Figure 5B:
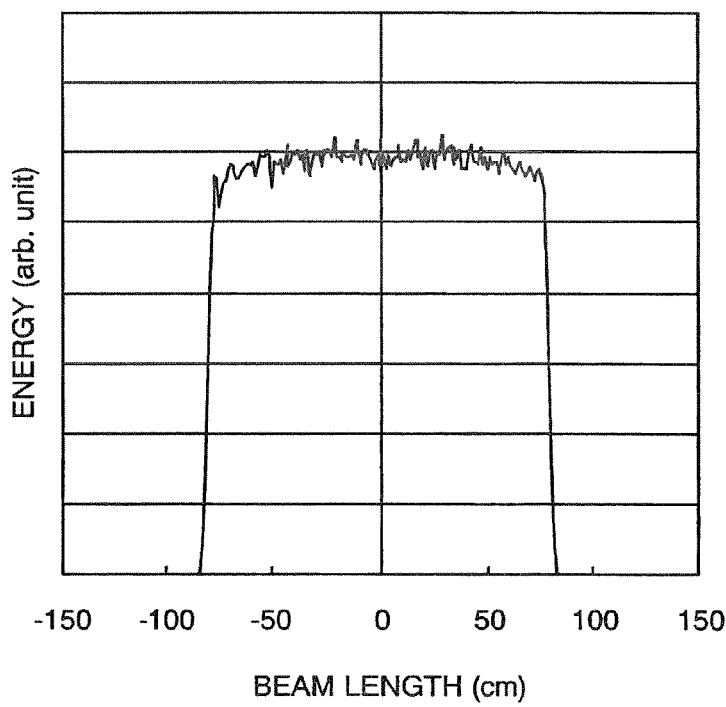

Further, results of simulation by optical design software are shown in FIGS. 5A and 5B. The results indicate that the energy distribution of the linear laser beam in the major-axis direction has been improved. FIG. 5A shows the energy distribution formed on the irradiation surface when the linear laser beam is formed by using only the convex cylindrical lens array in the major-axis direction. When the energy distribution of the original beam is asymmetric, the energy distribution of the original beam is reflected as shown in this figure, and the intensity distribution on the irradiation surface is biased to one side.

Meanwhile, FIG. 5B is a graph showing the energy distribution in the major-axis direction of the linear laser beam formed by using the cylindrical lens array in which the above convex and concave cylindrical lenses are combined according to the present invention. As shown in the figure, the energy distribution is homogenized without being affected by the energy distribution of the original beam. As thus described, it is understood that the energy distribution has been improved in the major-axis direction, and more homogeneous beam can be formed on the irradiation surface by using the cylindrical lens array according to the present invention as shown in FIGS. 5A and 5B.

The laser oscillator used in the laser irradiation apparatus according to the present invention is not limited in particular, and various kinds of laser oscillators can be used. Among them, it is preferable to use a laser oscillator which has high output power and emits the wavelength sufficiently absorbed in the semiconductor film. When the semiconductor film is a silicon film, the wavelength of the laser beam emitted from the laser oscillator is preferably 600 nm or shorter in consideration of the absorption ratio. For example, an excimer laser, a YAG laser (harmonic), or a glass laser (harmonic) is given as the laser oscillator emitting such a laser beam. Although high output power is not obtained yet by the current technique, a $YVO_4$ laser (harmonic), a YLF laser (harmonic), and an Ar laser can be also used as the laser oscillator emitting the laser beam with wavelengths appropriate for crystallizing the silicon film.

Next, a method for manufacturing a semiconductor device with the use of the laser irradiation apparatus of the present invention is described using specific examples. First, a glass substrate (AN100) having a size of 600×720×0.7 mm is prepared as a substrate. The glass substrate has enough resistance against the heat up to 600° C. A silicon oxide film is formed in 200 nm thick over the glass substrate as a base film, and an amorphous silicon film is formed in 55 nm thick thereover. These films are formed by a sputtering method. Alternatively, they may be formed by a plasma CVD method.

The substrate with the films formed thereover is set under nitrogen atmosphere of 450° C. for an hour to decrease the concentration of hydrogen in the amorphous silicon film. This process is performed because the silicon film cannot resist the laser power when the silicon film contains too much hydrogen. The appropriate concentration of hydrogen in the film is approximately $10^{20}$ atoms/cm$^3$. Here, $10^{20}$ atoms/cm$^3$ means that $10^{20}$ hydrogen atoms exist in 1 cm$^3$.

This embodiment mode employs STEEL 1000 XeCl excimer laser manufactured by Lambda Physik, Inc. as the laser oscillator. This excimer laser is a pulsed laser oscillator having a maximum power of 1000 mJ per a pulse, an emission wavelength of 308 nm, and a maximum repetition frequency of 300 Hz. When the power of the pulsed laser beam fluctuates within ±10%, preferably within ±5%, in each pulse during the laser processing performed to one substrate, it is possible to perform homogeneous crystallization. The fluctuation of the laser power described above is defined as follows. The average value of the laser power in the period of the irradiation to one substrate is assumed to be standard. Then, the fluctuation of the laser power is defined as the value expressing the difference between the average value and the maximum or minimum value in the period of the irradiation in percentage terms.

The laser beam is delivered in such a way that, for example, a stage with an irradiation surface mounted thereover is scanned in the direction of the minor axis of the rectangular beam spot. At the laser irradiation, a practitioner may determine the energy density and the scanning speed of the beam spot on the irradiated surface appropriately within the range that the desired crystallization is performed. The energy density is appropriate in the range of 200 to 1000 mJ/cm$^2$. It is feasible to perform laser annealing homogeneously when the scanning speed is selected in the range where the width of the rectangular beam spot in its minor-axis direction is overlapped one another by approximately 90% or more. The optimum scanning speed depends on the pulse repetition frequency of the laser oscillator, and may be regarded to be proportional to the pulse repetition rate thereof.

By performing the process as above, the amorphous silicon film is annealed and crystallized. When the above step is performed repeatedly to the amorphous silicon film, many substrates can be processed. The substrate processed thus can be utilized to manufacture an active matrix liquid crystal display and an EL display device according to a known method. The above-mentioned manufacturing method uses the excimer laser as the laser oscillator. Since the excimer laser has a coherent length as short as several μm, the excimer laser is suitable for the optical system of the laser irradiation apparatus in the above manufacturing method.

Although some of the lasers shown below have the long coherent length, the laser whose coherent length is changed deliberately may be employed in the case of using such lasers in the manufacturing process described above. It is also preferable to use the harmonic of the YAG laser or the harmonic of the glass laser because they also have high output power and energy which is sufficiently absorbed in the silicon film. As the laser oscillator appropriate for the crystallization of the silicon film, the $YVO_4$ laser (harmonic), the YLF laser (harmonic), the Ar laser, and the like are given. The wavelengths of these laser beams are sufficiently absorbed in the silicon film.

The above method for manufacturing a semiconductor device uses the amorphous silicon film as the non-single crystal semiconductor film. However, it is easily supposed that the present invention can be applied to other non-single crystal semiconductor films. For example, a compound semiconductor film having an amorphous structure, for example an amorphous silicon germanium film may be used. Further, the non-single crystal semiconductor film may be not only an amorphous film but also a poly-crystalline film, for example a poly-crystalline silicon film.

Next, in relation with a laser irradiation method according to the present invention, an embodiment mode (hereinafter referred to as a second embodiment mode), which is different from the first embodiment mode shown in FIGS. 4A and 4B, is described in detail. As two kinds of cylindrical lens arrays in the second embodiment mode, the wave-like cylindrical lens array illustrated in FIG. 3B as described above is used. In this case, the two kinds of cylindrical lens arrays comprise a first combined cylindrical lens array and a second combined cylindrical lens array. In the first and second cylindrical lens arrays, convex cylindrical lenses and concave cylindrical lenses are arranged alternately in a direction of curvature as shown in FIG. 6.

When the first and second combined cylindrical lens arrays are further combined, it is necessary that the positions of the convex cylindrical lens and the concave cylindrical lens are inverse. Specifically, as shown in FIG. 6, it is necessary that the concave cylindrical lens of the first combined cylindrical lens array is connected to the convex cylindrical lens of the second combined cylindrical lens array in a direction of their generating lines.

That is to say, it is necessary to combine both lens arrays so that the concave cylindrical lens of the upper array comes over the convex cylindrical lens of the lower array and so that the generating lines of both cylindrical lenses are connected as shown in FIG. 6. Simply speaking, two kinds of wave-like cylindrical lens arrays need to be arranged so that the convex portions are opposite as shown in FIG. 6, and they are connected in the inverse relation. As a result, even though the original beam has the bias in the energy intensity distribution, the laser beams transmitted through the cylindrical lens arrays are projected to the irradiation surface with their intensity distribution inverted to each other. Therefore, it becomes possible to offset the bias in the intensity distribution of the original beam. Thus, the linear laser beam with high homogeneity can be formed on the irradiation surface.

Embodiment 1

The present invention is hereinafter described more specifically as taking an embodiment for manufacturing a TFT as an example. However, the present invention is not limited to this embodiment, but specified by the scope of claims. This embodiment describes a step of manufacturing a thin film transistor (TFT) with a laser irradiation apparatus of the present invention with reference to FIGS. 7A to 7D.

Figure 7A:
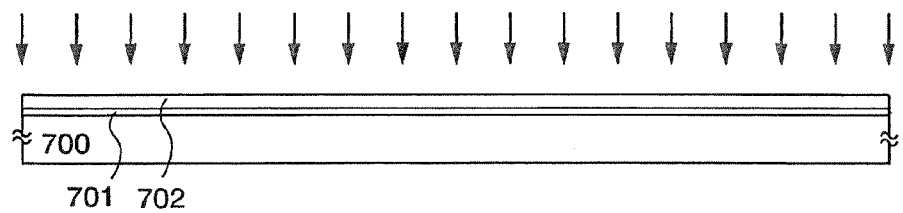
FIGS. 7A to 7D are drawings showing processes for manufacturing a thin film transistor (TFT) using a laser irradiation apparatus of the present invention.

First, a base film 701 is formed over a glass substrate 700 having an insulating surface as shown in FIG. 7A. The glass substrate 700 may be, for example, a glass substrate such as barium borosilicate glass or alumino borosilicate glass, a quartz substrate, a SUS substrate, or the like. In addition, although a substrate made of flexible synthetic resin such as acrylic or plastic typified by PET (polyethylene terephthalate), PES (polyethylene sulfone), PEN (polyethylene naphthalate), or the like tends to be inferior to other substrates in point of the resistance against the heat, the substrate made of flexible synthetic resin can be used when the substrate can resist the processing temperature in the manufacturing process.

The base film 701 is provided in order to prevent the alkali-earth metal or alkali metal such as Na included in the glass substrate 700 from diffusing into a semiconductor film. The alkali-earth metal or alkali metal causes an adverse effect on the characteristic of the semiconductor element when it is in the semiconductor. Therefore, the base film is formed of an insulating material such as silicon oxide, silicon nitride, or silicon nitride oxide, which can suppress the diffusion of the alkali-earth metal and alkali metal into the semiconductor film. In the present embodiment, a silicon nitride oxide film is formed in thickness from 10 to 400 nm by a plasma CVD method. When the substrate such as a quartz substrate is used which hardly diffuses the impurity, the base film is not always necessary to be provided.

Figure 7B:
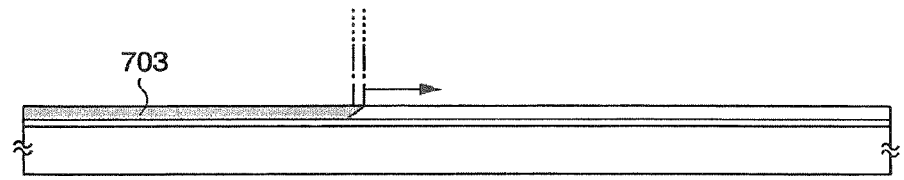

Next, an amorphous semiconductor film 702 is formed over the base film 701 in thickness from 25 to 100 nm (preferably from 30 to 60 nm). The amorphous semiconductor film 702 may be silicon or silicon germanium. Silicon is used in this embodiment. When silicon germanium is used, it is preferable that the concentration of germanium is in the range of approximately 0.01 to 4.5 atomic %. Next, the laser irradiation apparatus of the present invention is used to irradiate the amorphous semiconductor film 702 with the laser beam and to crystallize it as shown in FIG. 7B.

In this embodiment, an excimer laser providing 300 W is used. The laser beam is scanned in the direction indicated with an arrow shown in FIG. 7B on the surface of the amorphous semiconductor film 702. By irradiating the amorphous semiconductor film 702 with the laser beam, a crystalline semiconductor film 703 is formed. The laser irradiation may be performed in the inert atmosphere such as nitrogen or noble gas. This can suppress the roughness of the surface of the semiconductor film due to the laser irradiation and suppress the variation of the threshold due to the variation of the interface state density.

Figure 7C:
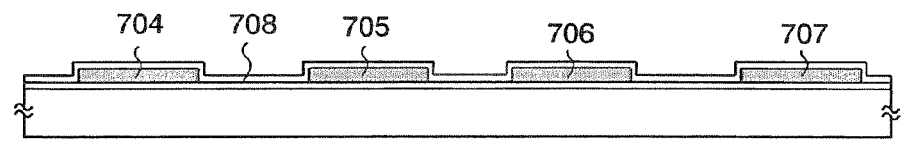

Next, the crystalline semiconductor film 703 is patterned to form island-shaped semiconductor films 704 to 707 as shown in FIG. 7C. The island-shaped semiconductor films 704 to 707 are used to form various semiconductor elements typified by a TFT. A gate insulating film 708 is formed so as to cover the island-shaped semiconductor films 704 to 707. The gate insulating film 708 can be formed of silicon oxide, silicon nitride, silicon nitride oxide, or the like by the plasma CVD method, the sputtering method, or the like. In this embodiment, an insulating film including silicon is formed in thickness from 30 to 200 nm by the sputtering method.

Figure 7D:
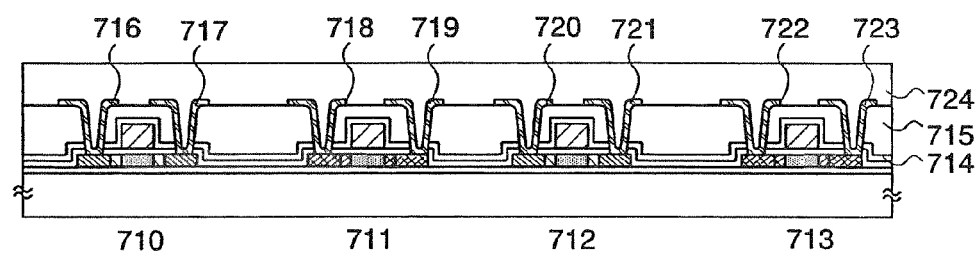

Next, a gate electrode (not shown) is formed by patterning a conductive film over the gate insulating film. Then, a source region, a drain region, an LDD region, and the like are formed by selectively adding an impurity imparting n-type or p-type conductivity to the island-shaped semiconductor films 704 to 707 using the gate electrode as a mask or using the resist to be formed and patterned as a mask. The above process can form N-channel TFTs 710 and 712, and P-channel TFTs 711 and 713 over the same substrate (FIG. 7D). Subsequently, an insulating film 714 is formed as a protective layer for these TFTs. The insulating film 714 is formed in thickness from 100 to 200 nm with an insulating material including silicon by the plasma CVD method or the sputtering method. The insulating film 714 may have a single-layer structure or multilayer structure. In this embodiment, a 100-nm-thick silicon oxynitride film is formed by the plasma CVD method.

Next, an organic insulating film 715 is formed over the insulating film 714. The organic insulating film 715 is formed of an organic insulating material such as polyimide, polyamide, BCB, or acrylic by an SOG method. Since the insulating film 715 is formed mainly for the purpose of relaxing the concavity and convexity due to the TFT formed over the glass substrate 700 and planarizing the surface, the insulating film 715 is preferably a film that is easily planarized. Moreover, the insulating film 714 and the organic insulating film 715 are patterned by a photolithography method so as to form a contact hole that reaches the impurity region.

Next, a conductive film is formed with the conductive material, which is then patterned into wirings 716 to 723. Subsequently, when an insulating film 724 is formed as the protective film, a semiconductor device shown in FIG. 7D is completed. The method for manufacturing a semiconductor device using the laser irradiation method of the present invention is not limited to the above method for manufacturing a TFT. According to the present invention, a crystalline semiconductor film obtained by the laser irradiation is used as an active layer of the TFT. As a result, the variation of mobility, threshold, and on-current between the TFTs can be suppressed. It is to be noted that the laser irradiation condition is not limited to that shown in this embodiment.

Before the laser crystallization step, a crystallization step using the catalyst element may be performed. As the catalyst element, nickel (Ni), germanium (Ge), iron (Fe), palladium (Pd), tin (Sn), lead (Pb), cobalt (Co), platinum (Pt), copper (Cu), or gold (Au) can be used. The laser irradiation melts an upper part of the semiconductor film but does not melt a lower part of the semiconductor film. Therefore, a crystal remained without being melted in the lower part of the semiconductor film becomes a crystal nucleus, and the crystallization is promoted from the lower part toward the upper part of the semiconductor film.

Compared to the case in which the semiconductor film is crystallized only by the laser beam, it is possible to enhance the crystallinity of the semiconductor film further and to suppress the roughness of the surface of the semiconductor film after the laser crystallization. Therefore, the variation of the characteristics of the semiconductor element to be formed afterward typified by a TFT can be more suppressed and the off-current can be also suppressed. It is noted that the crystallization may be performed in such a way that the heat treatment is performed after the catalyst element is added in order to promote the crystallization and that the laser irradiation is performed in order to enhance the crystallinity further. Alternatively, the heat treatment may be omitted. Specifically, after adding the catalyst element, the semiconductor film may be irradiated with the laser beam instead of the heat treatment so as to enhance the crystallinity.

Although the present embodiment shows an example in which the laser irradiation method of the present invention is used to crystallize the semiconductor film, the laser irradiation method may be applied to activate the impurity element added in the semiconductor film. The method for manufacturing a semiconductor device by the present invention can be applied to the manufacturing method of integrated circuits and semiconductor display devices. Transistors for a functional circuit such as a driver or a CPU preferably have the LDD structure or a structure in which the LDD overlaps the gate electrode. To increase the speed, the transistors are preferably miniaturized. Since the transistors 710 to 713 completed by this embodiment have the LDD structure, they are preferably used for the driver circuit in which high speed operation is required.

Figure 8A:
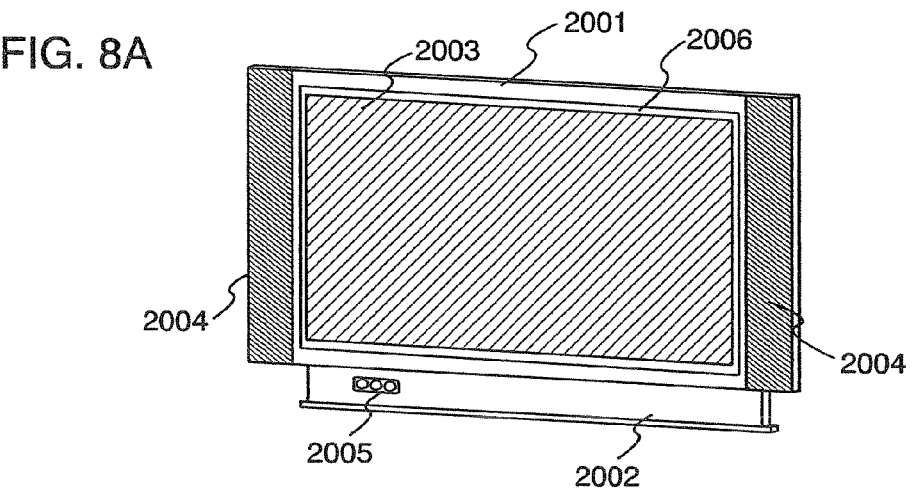
FIGS. 8A to 8C are drawings showing various electronic instruments having display devices which can be manufactured by the laser irradiation method of the present invention.

According to the present invention, the thin film transistors shown in FIG. 7 can be used to manufacture various electronic instruments. Examples of the electronic instruments are described with reference to FIGS. 8A to 8C. FIG. 8A shows a display device including a chassis 2001, a supporting stand 2002, a display portion 2003, speaker portions 2004, video input terminals 2005, and the like. This display device is manufactured by applying the thin film transistor formed by the manufacturing method shown in FIGS. 7A to 7D to the display portion 2003. The display device includes a liquid crystal display device and a light-emitting device. Specifically, the display device includes all the display devices for display information, such as a display for a computer, TV broadcast reception, and advertisement.

Figure 8B:
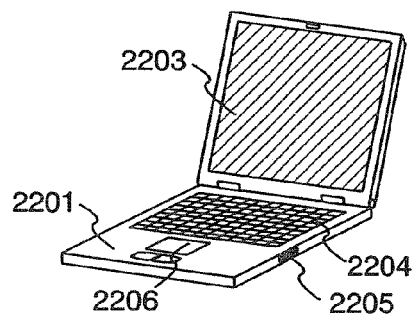
Figure 8C:
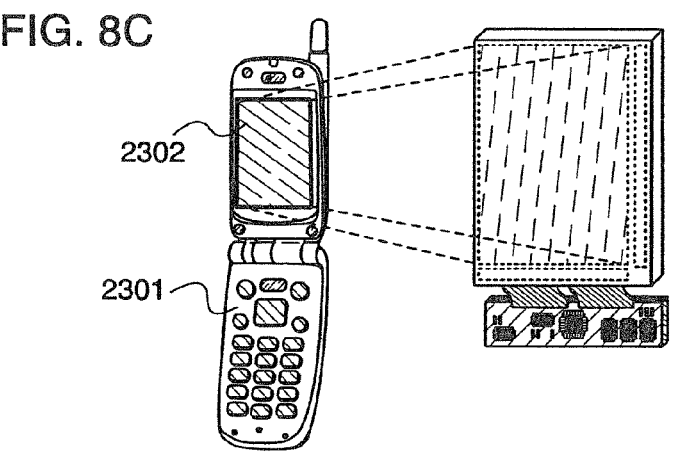

FIG. 8B shows a computer including a chassis 2201, a display portion 2203, a keyboard 2204, an external connection port 2205, a pointing mouse 2006, and the like. The manufacturing method shown in FIGS. 7A to 7D can be applied to the display portion 2203 and other circuits. Moreover, the present invention can be applied to semiconductor devices in the computer such as a CPU and a memory. FIG. 8C shows a mobile phone as one of mobile terminals, which includes a chassis 2301, a display portion 2302, and the like. Since electronic instruments such as the PDA, typified the mobile phone, and a digital camera are mobile terminals, their display screen is small. Therefore, by using the small transistors shown in FIG. 7D to form the functional circuit such as the CPU, the electronic instruments can be compact and lightweight.

The thin film transistor manufactured in this embodiment can be used as an ID chip. For example, by using the manufacturing method shown in FIGS. 7A to 7D, the transistors by the present invention can be applied to an integrated circuit and a memory in the ID chip. When the transistors are used as the memory, a circulation process of a product can be recorded. Further, when a manufacturing process of the product is recorded, it becomes easy for wholesalers, retailers; and consumers to know a production area a producer, a production date, a process method, and the like. As thus described, the application of the semiconductor device manufactured by the present invention covers a wide range, and the semiconductor device manufactured by the present invention can be applied to various electronic instruments of every field.

What is claimed is:

1. A laser irradiation apparatus comprising:
   a cylindrical lens array configured to divide a laser beam into a plurality of laser beams, the cylindrical lens array comprising a first cylindrical lens and a second cylindrical lens in direct contact with the first cylindrical lens;
   a first combined cylindrical lens array in which first convex cylindrical lenses and first concave cylindrical lenses are arranged alternately in a direction of curvature; and
   a second combined cylindrical lens array in which second convex cylindrical lenses and second concave cylindrical lenses are arranged alternately in a direction of curvature,
   wherein the first combined cylindrical lens array and the second combined cylindrical lens array are stacked in a direction of a generating line of the first concave cylindrical lens,
   wherein the first concave cylindrical lens comprises a concave surface and a flat surface opposite the concave surface,
   wherein a direction of curvature of the cylindrical lens array is perpendicular to a direction of curvature of each of the first and second combined cylindrical lens arrays, and
   wherein an outer shape of a beam exit surface of the first cylindrical lens is the same as an outer shape of a beam exit surface of the second cylindrical lens.

2. The laser irradiation apparatus according to claim 1, further comprising a condensing lens configured to superpose a plurality of laser beams transmitted through the first combined cylindrical lens array and the second combined cylindrical lens array.

3. The laser irradiation apparatus according to claim 1, further comprising a laser oscillator, wherein the cylindrical lens array is provided between the laser oscillator and the first and second combined cylindrical lens arrays.

4. The laser irradiation apparatus according to claim 1, further comprising an excimer laser oscillator.

5. The laser irradiation apparatus according to claim 1,
   wherein the cylindrical lens array is configured to condense one of the plurality of laser beams onto the first convex cylindrical lenses and the first concave cylindrical lenses, and
   wherein the cylindrical lens array is configured to condense another one of the plurality of laser beams onto the second convex cylindrical lenses and second concave cylindrical lenses.

6. A laser irradiation apparatus comprising:
   a cylindrical lens array configured to divide a laser beam into a plurality of laser beams, the cylindrical lens array comprising a first cylindrical lens and a second cylindrical lens in direct contact with the first cylindrical lens;
   a first combined cylindrical lens array in which first convex cylindrical lenses and first concave cylindrical lenses are arranged alternately in a direction of curvature; and
   a second combined cylindrical lens array in which second convex cylindrical lenses and second concave cylindrical lenses are arranged alternately in a direction of curvature,
   wherein the first combined cylindrical lens array and the second combined cylindrical lens array are stacked in a direction of a generating line of the second convex cylindrical lens,
   wherein the first concave cylindrical lens comprises a concave surface and a flat surface opposite the concave surface, wherein a direction of curvature of the cylindrical lens array is perpendicular to a direction of curvature of each of the first and second combined cylindrical lens arrays, and wherein an outer shape of a beam exit surface of the first cylindrical lens is the same as an outer shape of a beam exit surface of the second cylindrical lens.

7. The laser irradiation apparatus according to claim 6, further comprising a condensing lens configured to superpose a plurality of laser beams transmitted through the first combined cylindrical lens array and the second combined cylindrical lens array.

8. The laser irradiation apparatus according to claim 6, further comprising a laser oscillator, wherein the cylindrical lens array is provided between the laser oscillator and the first and second combined cylindrical lens arrays.

9. The laser irradiation apparatus according to claim 6, further comprising an excimer laser oscillator.

10. The laser irradiation apparatus according to claim 6,
wherein the cylindrical lens array is configured to condense one of the plurality of laser beams onto the first convex cylindrical lenses and the first concave cylindrical lenses, and
wherein the cylindrical lens array is configured to condense another one of the plurality of laser beams onto the second convex cylindrical lenses and second concave cylindrical lenses.

11. A laser irradiation apparatus comprising:
a cylindrical lens array configured to divide a laser beam into a plurality of laser beams, the cylindrical lens array comprising a first cylindrical lens and a second cylindrical lens in direct contact with the first cylindrical lens;
a first combined cylindrical lens array in which first convex cylindrical lenses and first concave cylindrical lenses are arranged alternately in a direction of curvature; and
a second combined cylindrical lens array in which second convex cylindrical lenses and second concave cylindrical lenses are arranged alternately in a direction of curvature, wherein the first combined cylindrical lens array and the second combined cylindrical lens array are stacked so that a generating line of the first concave cylindrical lens is connected to a generating line of the second convex cylindrical lens, wherein the first concave cylindrical lens comprises a concave surface and a flat surface opposite the concave surface, wherein a direction of curvature of the cylindrical lens array is perpendicular to a direction of curvature of each of the first and second combined cylindrical lens arrays, and wherein an outer shape of a beam exit surface of the first cylindrical lens is the same as an outer shape of a beam exit surface of the second cylindrical lens.

12. The laser irradiation apparatus according to claim 11, further comprising a condensing lens configured to superpose a plurality of laser beams transmitted through the first combined cylindrical lens array and the second combined cylindrical lens array.

13. The laser irradiation apparatus according to claim 11, further comprising a laser oscillator, wherein the cylindrical lens array is provided between the laser oscillator and the first and second combined cylindrical lens arrays.

14. The laser irradiation apparatus according to claim 11, further comprising an excimer laser oscillator.

15. The laser irradiation apparatus according to claim 11,
wherein the cylindrical lens array is configured to condense one of the plurality of laser beams onto the first convex cylindrical lenses and the first concave cylindrical lenses, and
wherein the cylindrical lens array is configured to condense another one of the plurality of laser beams onto the second convex cylindrical lenses and second concave cylindrical lenses.

* * * * *